April 4, 1944. R. G. JEWELL 2,345,936
TELEMETERING RECEIVER
Original Filed Jan. 17, 1942  2 Sheets-Sheet 1
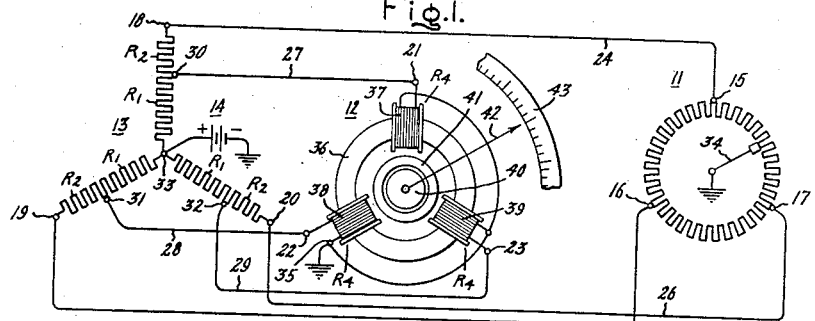
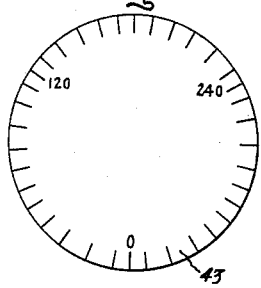
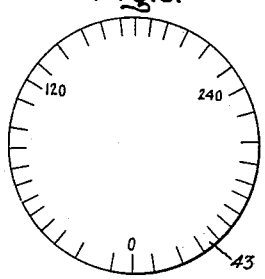
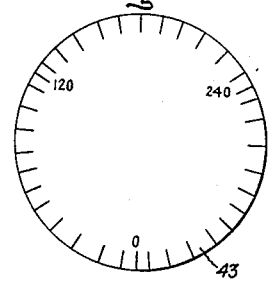
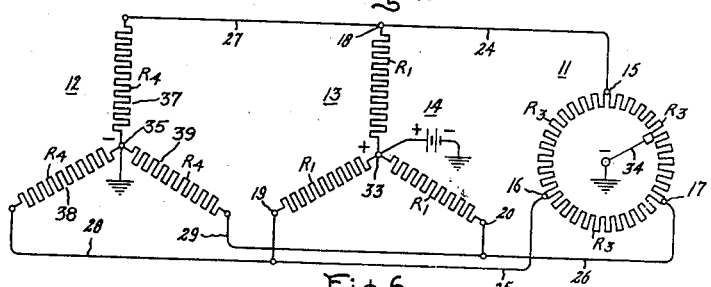
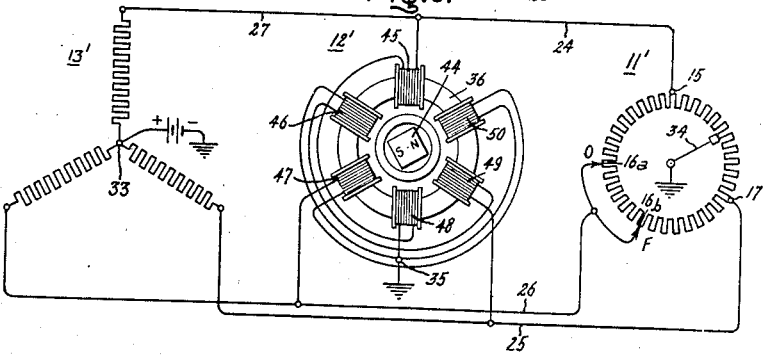
Inventor:
Richard G. Jewell,
by Harry E. Dunham
His Attorney.

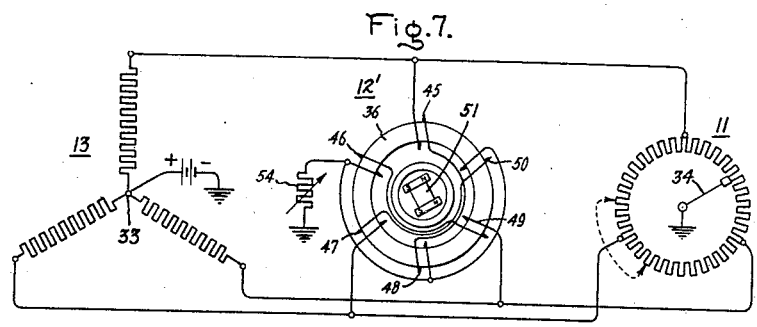
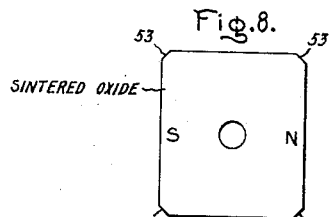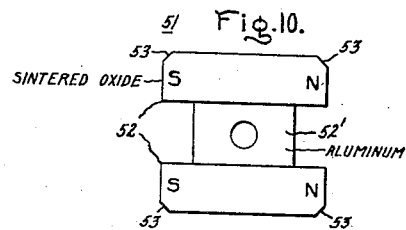
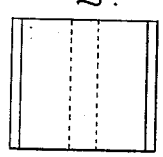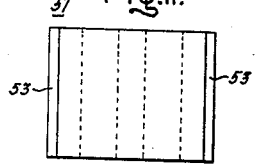
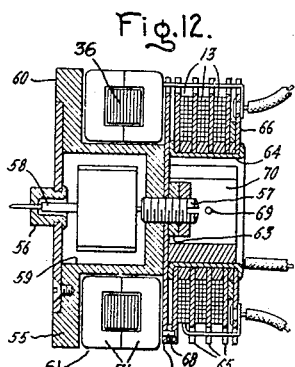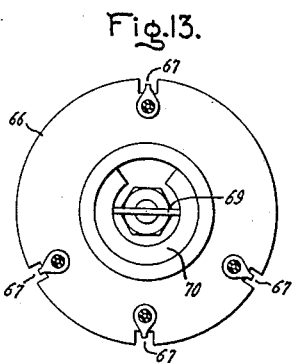
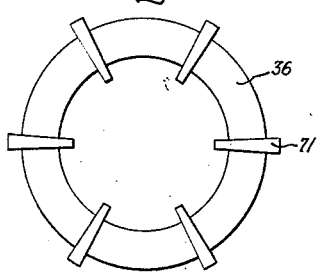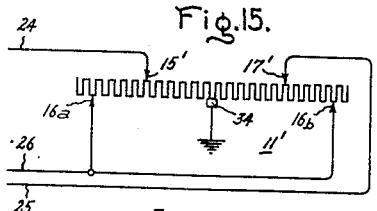

Patented Apr. 4, 1944

UNITED STATES PATENT OFFICE 2,345,936

2,345,936

TELEMETERING RECEIVER

Richard G. Jewell, Swampscott, Mass., assignor to General Electric Company, a corporation of New York Original application January 17, 1942, Serial No. 427,081. Divided and this application April 30, 1943, Serial No. 485,238

5 Claims. (Cl. 171—95)

My invention relates to telemetering receivers, and this application is a division of my application Serial No. 427,081, filed January 17, 1942, wherein a telemetering system is disclosed which is provided with sturdy, compact, and reliable transmitting and receiving apparatus, and wherein the transmitter may have only one movable brush, and with the system arranged for long scale operation with provisions for adjustable zero and full scale points. While the claims herein are directed to the receiving apparatus, a description of the complete system is desirable for a satisfactory understanding of the features which determine the receiver scale distribution.

In the telemetering system described in Patent No. 2,248,616, Faus, assigned to the same assignee as the present invention, a transmitter is employed comprising a resistor which may be wound toroidally or may be wound as a pair of straight resistors and which is adapted to have a pair of brushes sliding along it energized with direct current, one brush having one polarity and the other brush having the opposite polarity. The receiver consists of a delta connected ring wound stator with a transversely magnetized cylindrical permanent-magnet rotor. Three conductors are connected between corresponding points in the transmitter resistor and the receiver so that the rotation of the transmitter brushes produces variation in the current distribution in the receiver coils and thereby shifts the angular direction of the magnetic flux passing diametrically across the receiver stator. In this manner the receiver rotor is caused to reproduce the angular position of the rotatable member carrying the transmitter brushes, if the transmitter has a toroidal resistor. If the transmitter has a straight line resistor, the straight line motion is converted into angular rotation at the receiver. Although one of the brushes may be grounded if all three of the conductors joining the transmitter and the receiver are insulated from ground, it is necessary that the second brush be insulated from ground.

In order to simplify the mechanical problems involved in the construction of the transmitter and in order to facilitate making the transmitters interchangeable with different types of receivers, with provision for reversing the direction of deflection by interchanging leads at the external connections of either the transmitter or the receiver, I prefer to utilize a transmitter with a single brush and to utilize a construction in which the brush may be grounded so that it may be connected directly to the shaft of a rotatable element the angular position of which is to be indicated or reproduced at a distance. I desire, however, to retain the ability of the system to rotate through a large scale angle and in certain cases to make any desired number of complete revolutions. I have found that I may utilize a single grounded brush and still retain the long scale feature by employing a supplementary set of current-distributing resistors. These may be Y-connected to the three conductors joining the transmitter and receiver if a three-conductor system is employed. It will be understood, however, that my invention is not limited to a three-conductor system and that if a greater number of conductors were employed the supplementary resistors would be increased in number and would be star-connected. Such a system of supplementary resistors tends to distort the field of the receiver and I have found that this field distortion may be reduced by grounding the Y point or neutral of the supplementary resistance Y. A further reduction in distortion of scale distribution and torque is obtained by further modifications in the supplementary resistance or in the receiver construction as will be described more in detail hereinafter.

A better understanding of my invention will be afforded by the following detailed description considered in connection with the accompanying drawings, and those features of the invention which are believed to be novel and patentable are pointed out in the claims. In the drawings, Fig. 1 is an electrical circuit diagram schematically representing one embodiment of my invention; Figs. 2 and 3 are full circle scales representing two different scale distributions, by way of example, which may be obtained by two different illustrative sets of resistance relationships in the apparatus represented in Fig. 1; Fig. 4 is an electrical circuit diagram schematically representing a certain simplification in the arrangement of Fig. 1; Fig. 5 is a full circle scale illustrating a scale distribution which may be obtained in the apparatus of Fig. 4 with one illustrative set of relationships between the resistances; Fig. 6 is an electrical circuit diagram schematically representing a modification in the electrical circuit of Fig. 4, utilizing a modified form of receiver in order to obtain increased uniformity of scale distribution and torque, and also illustrating a modified form of transmitter which may be utilized with any of the system modifications for providing independent zero and full scale adjustment of the scale where the scale is less than 360 degrees but closely approaches it; Fig. 7 is an electrical circuit diagram schematically representing a modification in the arrangement of Fig. 6 providing for adjustment of the degree of scale distribution; Figs. 8 and 9 are a plan view and an elevational view respectively of the modified form of receiver rotor shown in the apparatus of Fig. 6 which may be utilized in the apparatus of either Fig. 6 or Fig. 7; Figs. 10 and 11 are a plan view and an elevational view respectively of a modified receiver rotor shown in the apparatus of Fig. 7 which may also be employed in the apparatus of Fig. 6; Fig. 12 is a view of a section cut by a plane passing axially through the receiver in the apparatus of Fig. 6; Fig. 13 is a plan view of the apparatus of Fig. 12; Fig. 14 is a detail view of the coil box for the field structure of the receiver illustrated in Figs. 12 and 13, and Fig. 15 is a schematic diagram of a modified form of transmitter for straight line motion. Like reference characters are used throughout the drawings to designate like parts.

The embodiments of my telemetering system illustrated in Figs. 1 and 4 each comprise a transmitter 11, a receiver 12, a supplementary set of current-distributing resistances 13 shown Y-connected to a source of electrical energy 14 which may take the form of a suitable direct current source such as a battery of cells. The systems illustrated employ three conductors and each of the three principal elements 11, 12 and 13 accordingly has three connection points each corresponding to a connection point of the other two elements. The transmitter 11 has three terminals 15, 16 and 17 corresponding to terminals 18, 19 and 20 of the supplementary resistors 13. The receiver 12 also has three terminals 21, 22 and 23 corresponding to the terminals previously mentioned.

In the simplified arrangement of Fig. 4 the corresponding terminals are connected together by means of conductors 24, 25 and 26 extending from the transmitter 11 to the resistance set 13 and conductors 27, 28 and 29 extending between the receiver 12 and the resistance set 13. In the arrangement of Fig. 1, however, the conductors 27, 28 and 29 extend from taps 30, 31 and 32 on the resistor at 13 to the corresponding receiver terminals 21, 22 and 23 respectively.

In the arrangements shown the positive terminal of the current source 14 is connected to the Y-point 33 of the resistance set 13 and the negative terminal of the current source 14 is connected to the single rotatable brush 34 of the transmitter 11. The connection is made by grounding the negative terminal of the current source 14 and the transmitter brush 34 to the frame of the machine or ship on which the telemetering system is employed. In this manner need for an insulated conductor joining these parts is obviated. If the receiver 12 is to have no grounded neutral, it may be Y or delta connected, and it may take the form illustrated in Fig. 4 of Patent No. 2,248,616, Faus. However, I prefer to connect the receiver coils in star or Y as shown in Figs. 1 and 4 and to connect the neutral point 35 to the negative terminal of the current source 14 for the sake of providing a more nearly uniform distribution of indications and torque throughout the scale range of the instrument. As illustrated the neutral point 35 is grounded.

The receiver 12 comprises a low hysteresis, relatively permeable stator core 36 linking three receiver coils 37, 38, and 39, a transversely magnetized rotatably mounted right-circular cylindrical rotor 40 composed of high coercive force material such as sintered oxides of iron and cobalt as described in the aforesaid Faus patent, a damping ring 41, a pointer 42 carried by the rotor 40 and a scale 43 cooperating with the pointer 42. The scale 43 is shown in fragmentary form in Fig. 1, but it will be understood that it may form a complete circle and that the pointer 42 will make any number of complete or fractional revolutions made by the transmitter brush 34.

This action takes place as a result of the variation of current distribution in the receiver coils 37, 38 and 39 produced by varying the point on the transmitter 11 to which the negative or grounded connection is made by the brush 34. For example, when the brush 34 is at the transmitter terminal 15 the receiver coil 37 is in effect grounded on both sides and current flows equally through the receiver coils 38 and 39. The fluxes produced by the coils 38 and 39 under this condition act in opposition with respect to the circular circuit through the receiver core 36 and combine to produce a vertical diametrical flux across the core 36 causing the rotor 40 to take up a position with its line of polarization, that is, a line joining the north and south poles, in the vertical position. Rotation of the transmitter brush 34 changes the current distribution in the various receiver coils and produces a rotation of the receiver pointer 41 corresponding to the rotation of the transmitter brush 34. The direction of rotation of the receiver may be reversed by interchanging the connections of any two conductors to the terminals of the transmitter, or the receiver. No internal connections need be disturbed.

However, in the simple system, particularly in the system without the grounded neutral in the receiver 12, the scale distribution in the scale points between the transmitter terminals is not reproduced exactly by the receiver pointer. Grounding the neutral point of the receiver has the effect of minimizing the distortion. The scale distribution illustrated in Fig. 5 may be obtained with the following illustrative values of resistance:

$R_1 = 125$ ohms
$R_3 = 127$ ohms
$R_4 = 250$ ohms where $R_1$ equals the resistance of each of the three arms of the resistance set 13 in Fig. 4, $R_3$ equals the resistance from one transmitter terminal to the next terminal of the transmitter 11, and $R_4$ equals the resistance of each of the coils 37, 38 and 39 of the receiver 12.

An improvement in the uniformity of the scale distribution may be obtained by the connection illustrated in Fig. 1. In this case $R_1$ is the value of each of the resistances from the neutral point 33 to the intermediate terminals 30, 31 and 32 of the supplementary resistance 13, and $R_2$ is the resistance value between the aforesaid terminals 30, 31 and 32 and the end terminals 18, 19 and 20, respectively. The scale distribution of Fig. 2 may be obtained with the following values of resistance:

$R_1 = 125$ ohms
$R_2 = 30$ ohms
$R_3 = 127$ ohms
$R_4 = 250$ ohms and the scale distribution of Fig. 3 may be obtained with the resistance values $R_1 = 250$ ohms
$R_2 = 90$ ohms
$R_3 = 127$ ohms
$R_4 = 250$ ohms My invention is not limited to the use of particular resistance values or resistance relationships and it will be understood that the aforesaid specific values are given merely by way of illustration.

The scale distribution may be varied by varying any one of the resistances $R_1$, $R_2$ or $R_3$ with respect to $R_4$. However, I have found that variation of the resistance $R_2$ is most effective. By increasing this resistance value I may open the scale near the points corresponding to the transmitter taps 15, 16 and 17 and accordingly compress the scale between the points corresponding to the transmitter taps. Decreasing this resistance value has the opposite effect. The effect of the resistance variation is illustrated by the comparison of the scale distributions in Figs. 2 and 3.

Although the telemetering system has been shown with a circular type of transmitter 11, it will be understood that the invention is not limited to the use of this precise form of transmitter and that a straight line transmitter, for example, may also be utilized such as shown for instance in U. S. Patent No. 2,294,741, Sept. 1, 1942, Fisk et al., and copending application Serial No. 424,779, filed July 1, 1941, by R. G. Ballard, both assigned to the same assignee as the present application.

In Fig. 6 I have illustrated a telemetering system employing a slightly modified type of transmitter 11' in which one of the transmitter terminals 16 is replaced by a pair of electrically connected independently movable taps or brushes 16a and 16b for independently setting the zero and full scale positions of the pointer when the system is used with a long scale, for example 300-degree scale indicator. This modified type of transmitter may also be employed with the embodiments of Figs. 1 and 4. If the transmitter brush 34 has straight-line motion a straight transmitter 11' may be used as shown in Fig. 15 with adjustable taps 15', 17', 16a, and 16b.

Relative freedom from distortion of either the scale distribution or the receiver torque by the effect of the resistors 13 may be obtained without utilizing the special connection of Fig. 1 including resistor $R_2$ by a special design of the receiver which I have devised. In place of the three-coil receiver shown in Figs. 1 and 4, I may employ a six-coil receiver 12' as shown in Fig. 6, and a rectangular rotor 44. The receiver 12' has stator coils wound on the core 36 such as illustrated in Figs. 1 and 4. However, it has six coils 45 to 50 inclusive. In the arrangement illustrated, which is a triple-conductor system, the six-coil receiver is also connected in Y. The opposite coils 45 and 48 are connected in series between the conductor 27 and the grounded neutral 35. The other two pairs of opposite coils are similarly connected in series between the line terminals and ground. The opposite coils are so wound as indicated schematically in Fig. 7 as to cause opposing fluxes in the core 36 with respect to the circular path thereby producing aiding diametrical flux components in the space occupied by the rotor. The connection of the neutral point to ground with six coils results in some distortion of the magnetic field of the receiver 12'. However, this distortion is utilized in conjunction with modified shape of the substantially square rotor 44, which would in itself tend to have a distorted magnetic field as compared with a transversely magnetized circular cross-section permanent magnet rotor.

Instead of the rectangular permanent magnet rotor 44 a composite rotor 51 such as illustrated in Fig. 7 may be employed. The rotor 51 is illustrated in greater detail in Figs. 10 and 11, and like the rotors 44 and 40 may comprise high coercive force magnetic material such as sintered oxide. In the case of the composite rotor there are two relatively short thick sintered-oxide parallel bars 52 joined by a non-magnetic block such as the block 52' composed of aluminum which is suitably mounted on pivots, or on a spindle to provide a rotatable mounting for the rotor 51. Preferably the corners 53 of either the rotor 44 or the rotor 51 are slightly beveled, as illustrated in Figs. 8 and 10.

I have found that in the case of the circular cross-section transversely magnetized rotor very accurate alignment with the direction of the stator magnetic field is obtained. However, certain inherent errors may exist if distortion in the field is produced by errors arising in a transmitter. I have found that the six-coil indicator 12' provides sufficient distortion in the receiver field near the coils to provide the right sort of compensation to correct for the errors in the resistance system comprising the transmitter providing a rotor is used which has the proper width of pole face to properly utilize this distorted field. Either the rotor 44 or the rotor 51 is suitable for this purpose. The double-bar composite rotor 50 illustrated in Fig. 7 appears to be preferable to the substantially square solid bar rotor 43 shown in Fig. 6 when the type of resistance system 13 shown in Fig. 4 is utilized in place of the type of resistance system 13 shown in Fig. 1. However, my invention is not limited to the use of either one type of rotor or the other and, in the case of composite rotors, is not limited to the use of rotors made up of only two bars as a similar effect may be obtained from a relatively wide solid bar rotor with curved pole faces or by the use of a narrow bar rotor with pole shoes wider than the natural pole face of the magnet. The rectangular rotors of Figs. 6 and 7 give improved results by minimizing errors inherent in the transmitter when used with two-brush transmitters of the type disclosed in the aforesaid Faus Patent 2,248,616, especially when the rotor is installed in the six-coil field of Figs. 6 and 7.

I have found that a particularly good scale distribution and torque variation from the standpoint of uniformity may be obtained by utilizing a modified connection illustrated in Fig. 7 in which a variable resistor 54 is introduced in the neutral grounding connection of the receiver 12'. The degree of correction of scale and torque distortion may be adjusted by varying the value of the resistance of the rheostat 54.

The receivers illustrated schematically in Figs. 1 to 7 may be constructed in a very compact and sturdy form utilizing the construction illustrated in Figs. 12 and 13. This applies particularly to the six-coil receiver 12'. This structural form of receiver comprises a base 55 to which are secured suitable bearings 56 and 57 for the rotor-carrying spindle 58. It will be observed that the bearing 57 is in the form of a removable adjustable screw which is bored at one end to receive one end of the spindle 58. The frame 55 is composed of relatively high conductivity material such as brass or aluminum so that it serves also as a damping ring for the rotor. It is shaped to form a cup 59 integral with flanges 60. The winding structure 61 surrounds the cup portion 59 and rests against the flange portion 60 to which it is secured by a suitable disk 62 fitting over the bearing screw 57 and secured against the cup portion 59 of the frame 55 by a nut 63 threaded on to the screw 57. The three resistors 13 and, if desired, also the fourth resistor 54 may be mounted on the frame 55 to form a complete unitary structure to be placed at the receiving end of the telemetering system. As illustrated in Fig. 12, the three resistors 13 are wound in pancake form on a spool 64 with suitable separating insulator disks or flanges 65. An end flange 66 is provided which is notched at a suitable point 67 on the periphery for receiving the connections to the resistors 13 and the spool 64 is secured to the disk 62 in any desired manner as by screws 68.

If desired a control magnet or pull-off magnet of the type and for the purpose described in Patent No. 2,181,803, Faus, is mounted within the spool 64. For example, as illustrated in Fig. 13 a control magnet 69 is transversely mounted in an annular spring 70 adapted to fit frictionally within the hub of the spool 64 to be angularly as well as axially movable, thereby permitting both adjustment of the strength of the pull-off torque and adjustment of the angular position of the receiver rotor in case of disconnection of the receiver coils from the power supply or power failure.

For maximum economy in the utilization of space and material the field structure 61 may take the form illustrated in Fig. 14, in which the core 35 has six wedge-shaped split hollow rectangular winding separators 71 mounted thereon. The respective coils are machine wound directly on to the core 36 into the spaces between the separators 71.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States, is:

1. A receiver for a telemetering system comprising an annular core composed of permeable magnetic material, a plurality of current-conducting coils linking said core and spaced substantially symmetrically around the center of the core, said receiver being of a type in which rotary motion is reproduced in response to relative variations in the energization of the several coils about the core, and a rotor mounted within the core in inductive relation to the current conducting coils, said rotor including polarized permanent magnet material for producing a magnetic field diametrically of the core of substantially a square shaped distribution in a plane perpendicular to the axis of rotation, said rotor field being shaped to compensate for distortions in the field produced in the core by said coils thereby to improve the deflection characteristics of the receiver.

2. A receiver for a telemetering system such as set forth in claim 1 in which the rotor comprises a pair of high coercive force bar magnets mounted parallel and spaced apart on a non-magnetic rotatable member in a plane perpendicular to the axis of rotation.

3. A receiver for a telemetering system comprising a frame composed of electrically conducting material having a cup portion and a flange portion adjacent the cup portion substantially coaxial therewith, a rotor rotatably mounted within said cup portion which cup portion serves as a damping cup for the rotor, a magnetic field producing unit mounted against said flange portion of the frame and around the cup portion and comprising an annular core of relatively permeable magnetic material wound with a plurality of current-conducting coils, a plurality of resistors wound in pancake form and laid together flatwise against said field producing unit substantially coaxial therewith and connections interconnecting said field coils and said resistors with a star connection.

4. A receiver for a telemetering system, said receiver being of the rotatable permanent magnet type, a spool mounted against said receiver flatwise substantially coaxial therewith, said spool containing a plurality of current distributing resistors interconnected with the receiver and having a hub portion, a member adjustable in position within said spool hub portion and a permanent magnet secured to said last-mentioned member in transverse position with respect to said spool hub and the axis of the instrument for providing an adjustable pull-off field adapted to react with the rotor of the receiver.

5. A receiver for a telemetering system such as set forth in claim 1 in which the rotor consists of a permanent magnet having a substantially square cross section perpendicular to the axis of rotation and centered with respect to said axis.

RICHARD G. JEWELL.